United States Patent
Rico Alvarino et al.

(10) Patent No.: US 10,681,684 B2
(45) Date of Patent: Jun. 9, 2020

(54) MULTI-PRB PAGING/RANDOM ACCESS FOR NB-IOT

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/618,088

(22) Filed: Jun. 8, 2017

(65) Prior Publication Data

US 2018/0020432 A1  Jan. 18, 2018

Related U.S. Application Data

(60) Provisional application No. 62/363,824, filed on Jul. 18, 2016.

(51) Int. Cl.
*H04W 72/04* (2009.01)
*H04W 74/08* (2009.01)
(Continued)

(52) U.S. Cl.
CPC ........... *H04W 72/042* (2013.01); *H04W 8/22* (2013.01); *H04W 72/048* (2013.01);
(Continued)

(58) Field of Classification Search
None
See application file for complete search history.

(56) References Cited

U.S. PATENT DOCUMENTS

2009/0316659 A1* 12/2009 Lindoff ............... H04J 11/0069
370/332
2014/0119308 A1* 5/2014 Mochida ............. H04B 7/0854
370/329
(Continued)

OTHER PUBLICATIONS

Catt., "Response LS on EPC Procedures for Providing eNB with V2X Authorization Information," 3GPP Draft; R3-161117; 3rd Generation Partnership Project (3GPP), mobile Competence centre, 650, Route Des Lucioles; F-06921 Sophia-Antipolis Cedex, France; vol. RAN WG3, No. Nanjing, China; May 23, 2016-May 27, 2016; May 22, 2016 (May 22, 2016), 1 page, XP051105925, Retrieved from the Internet: URL:http://www.3gpp.org/ftp/Meetings_3GPP_SYNC/RAN3/Docs/ [retrieved on May 22, 2016].
(Continued)

*Primary Examiner* — Ruihua Zhang
(74) *Attorney, Agent, or Firm* — Patterson & Sheridan, L.L.P.

(57) ABSTRACT

Aspects of the present disclosure provide techniques and apparatus for performing paging and/or random access procedures with multiple physical resource blocks (PRBs) for narrowband (NB) internet-of-things (IoT). In one aspect, a method is provided which may be performed by a base station. The method generally includes determining a first set of resources and a second set of resources available for narrowband communications with one or more first user equipments (UEs) and one or more second UEs. The method also includes allocating the first and second set of resources to one or more of the first UEs and the second UEs based at least in part on a type of the first UEs and a type of the second UEs. The method further includes signaling an indication of the allocation.

30 Claims, 13 Drawing Sheets

(51) Int. Cl.
  H04W 8/22   (2009.01)
  H04L 29/08  (2006.01)
  H04W 4/70   (2018.01)

(52) U.S. Cl.
  CPC ... *H04W 72/0453* (2013.01); *H04W 74/0833*
   (2013.01); *H04L 67/12* (2013.01); *H04W 4/70*
                                                (2018.02)

(56) References Cited

U.S. PATENT DOCUMENTS

2017/0272322 A1* 9/2017 You ..................... H04L 41/0853
2018/0070332 A1* 3/2018 Chen ....................... H04W 4/70
2018/0077696 A1* 3/2018 Lee ......................... H04W 4/70
2018/0152269 A1* 5/2018 Xiong ...................... H04L 5/00

OTHER PUBLICATIONS

Ericsson: "NB-IoT—NPRACH Configurations," 3GPP Draft; R1-161835, 3rd Generation Partnership Project (3GPP), Mobile Competence Centre; 650, Route Des Lucioles; F-06921; Sophia-Antipolis Cedex; France; Mar. 22, 2016-Mar. 24, 2016; Mar. 16, 2016 (Mar. 16, 2016), pp. 1-14, XP051080952, Retrieved from the Internet: URL:http://www.3gpp.org/ftp/tsg_ran/WG1_RL1/TSGR1_AH/LTE_NB-IoT_1603/Docs/[retrieved on Mar. 16, 2016].
"International Search Report and Written Opinion—PCT/US2017/036812—ISA/EPO—dated Oct. 18, 2017."
Vodafone., et al., "NB-IoT Enhancements Work Item Proposal," 3GPP Draft; RP-160813; 3rd Generation Partnership Project (3GPP); Mobile Competence Centre; 650, route des Lucioles; F-06921 Sophia-Antipolis Cedex; France; vol. TSG RAN; No. Busan; Korea; Jun. 13, 2016-Jun. 16, 2016; Jun. 12, 2016 (Jun. 12, 2016), 7 pages, XP051103657, Retrieved from the Internet: URL:http://www.3gpp.org/ftp/Meetings_3GPP_SYNC/RAN/Docs/ [retrieved on Jun. 12, 2016].
ZTE: "New WI Proposal on Further Enhancement of Cellular IoT for LTE," 3GPP Draft; RP-161175; 3rd Generation Partnership Project (3GPP); Mobile Competence Centre; 650, Route Des Lucioles; F-06921; Sophia-Antipolis Cedex; vol. TSG RAN, No. Busan, Korea; Jun. 13, 2016-Jun. 16, 2016; Jun. 14, 2016 (Jun. 14, 2016), 7 pages, XP051104025, Retrieved from the Internet: URL:http://www.3gpp.org/ftp/Meetings_3GPP_SYNC/RAN/Docs/ [retrieved on Jun. 14, 2016].

* cited by examiner

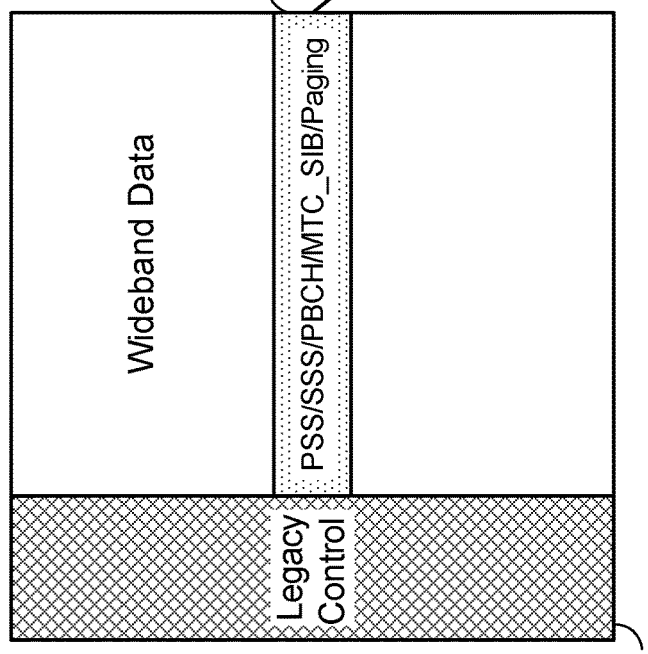
FIG. 5A
FIG. 5B

MULTI-PRB PAGING/RANDOM ACCESS FOR NB-IOT

CROSS-REFERENCE TO RELATED APPLICATIONS

This application claims the benefit of U.S. Provisional Patent Application Ser. No. 62/363,824, filed Jul. 18, 2016, which is assigned to the assignee hereof and hereby expressly incorporated by reference herein.

BACKGROUND

I. Field of the Disclosure

Certain aspects of the present disclosure generally relate to wireless communications and, more particularly, to multiple physical resource block (PRB) operations for narrowband internet-of-things (NB-IoT).

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to performing paging and/or random access procedures in multiple physical resource blocks (PRBs) for narrowband internet-of-things (NB-IoT).

Certain aspects of the present disclosure provide a method for wireless communications performed by a base station (BS). The method generally includes determining a first set of resources and a second set of resources available for narrowband communications with one or more first user equipments (UEs) and one or more second UEs. The method also includes allocating the first and second set of resources to one or more of the first UEs and the second UEs based, at least in part, on a type of the first UEs and a type of the second UEs. The method further includes signaling an indication of the allocation.

Certain aspects of the present disclosure provide an apparatus for wireless communications. The apparatus generally includes means for determining a first set of resources and a second set of resources available for narrowband communications with one or more first UEs and one or more second UEs. The apparatus also includes means for allocating the first and second set of resources to one or more of the first UEs and the second UEs based, at least in part, on a type of the first UEs and a type of the second UEs. The apparatus further includes means for signaling an indication of the allocation.

Certain aspects of the present disclosure provide an apparatus for wireless communication. The apparatus generally includes at least one processor, and a memory coupled to the at least one processor. The at least one processor is configured to determine a first set of resources and a second set of resources available for narrowband communications with one or more first UEs and one or more second UEs. The at least one processor is also configured to allocate the first and second set of resources to one or more of the first UEs and the second UEs based, at least in part, on a type of the first UEs and a type of the second UEs. The at least one processor is further configured to signal an indication of the allocation.

Certain aspects of the present disclosure provide a computer-readable medium having computer executable code stored thereon. The computer executable code generally includes code for determining, by a BS, a first set of resources and a second set of resources available for narrowband communications with one or more first UEs and one or more second UEs. The computer executable code also includes code for allocating, by the BS, the first and second set of resources to one or more of the first UEs and the second UEs based, at least in part, on a type of the first UEs and a type of the second UEs. The computer executable code further includes code for signaling an indication of the allocation.

Certain aspects of the present disclosure provide a method for wireless communications performed by a UE. The method includes receiving an indication of at least one parameter for determining a set of resources within a plurality of resources available for narrowband communications with a BS. The method also includes determining the set of resources to use for narrowband communications with the BS based at least in part on the indicated at least one parameter. The method further includes communicating with the BS using the determined set of resources.

Certain aspects of the present disclosure provide an apparatus for wireless communications. The apparatus generally includes means for receiving an indication of at least one parameter for determining a set of resources within a plurality of resources available for narrowband communications with a BS. The apparatus also includes means for determining the set of resources to use for narrowband communications with the BS based at least in part on the indicated at least one parameter. The apparatus further includes means for communicating with the BS using the determined set of resources.

Certain aspects of the present disclosure provide an apparatus for wireless communication. The apparatus generally includes at least one processor, and a memory coupled to the at least one processor. The at least one processor is configured to receive an indication of at least one parameter for determining a set of resources within a plurality of resources available for narrowband communications with a BS. The at least one processor is also configured to determine the set of resources to use for narrowband communications with the BS based at least in part on the indicated at least one parameter. The at least one processor is further configured to communicate with the BS using the determined set of resources.

Certain aspects of the present disclosure provide a computer-readable medium having computer executable code stored thereon. The computer executable code generally includes code for receiving, by a UE, an indication of at least one parameter for determining a set of resources within a plurality of resources available for narrowband communications with a BS. The computer executable code also includes code for determining, by the UE, the set of resources to use for narrowband communications with the BS based at least in part on the indicated at least one parameter. The computer executable code further includes code for communicating, by the UE, with the BS using the determined set of resources.

Certain aspects of the present disclosure provide a method for wireless communications performed by a BS. The method generally includes identifying a plurality of resource blocks available for transmitting a narrowband paging message to a UE. The plurality of resource blocks include at least an anchor resource block and one or more non-anchor resource blocks. The method also includes transmitting a control portion of the narrowband paging message to the UE using the anchor resource block. The method further includes transmitting a data portion of the narrowband paging message to the UE using one of the non-anchor resource blocks.

Certain aspects of the present disclosure provide an apparatus for wireless communications. The apparatus generally includes means for identifying a plurality of resource blocks available for transmitting a narrowband paging message to a UE. The plurality of resource blocks include at least an anchor resource block and one or more non-anchor resource blocks. The apparatus also includes means for transmitting a control portion of the narrowband paging message to the UE using the anchor resource block. The apparatus further includes means for transmitting a data portion of the narrowband paging message to the UE using one of the non-anchor resource blocks.

Certain aspects of the present disclosure provide an apparatus for wireless communication. The apparatus generally includes at least one processor, and a memory coupled to the at least one processor. The at least one processor is configured to identify a plurality of resource blocks available for transmitting a narrowband paging message to a UE. The plurality of resource blocks include at least an anchor resource block and one or more non-anchor resource blocks. The at least one processor is also configured to transmit a control portion of the narrowband paging message to the UE using the anchor resource block. The at least one processor is further configured to transmit a data portion of the narrowband paging message to the UE using one of the non-anchor resource blocks.

Certain aspects of the present disclosure provide a computer-readable medium having computer executable code stored thereon. The computer executable code generally includes code for identifying, by a BS, a plurality of resource blocks available for transmitting a narrowband paging message to a UE. The plurality of resource blocks include at least an anchor resource block and one or more non-anchor resource blocks. The computer executable code also includes code for transmitting, by the BS, a control portion of the narrowband paging message to the UE using the anchor resource block. The computer executable code further includes code for transmitting, by the BS, a data portion of the narrowband paging message to the UE using one of the non-anchor resource blocks.

Certain aspects of the present disclosure provide a method for wireless communications performed by a UE. The method generally includes determining a plurality of resources available for narrowband communications with a BS. The method also includes selecting at least one of the plurality of narrowband resources to monitor for a paging message from the BS based, at least in part, on a current coverage level of the UE and a past coverage level of the UE. The method further includes monitoring for the paging message in the selected narrowband resource.

Certain aspects of the present disclosure provide an apparatus for wireless communications. The apparatus generally includes means for determining a plurality of resources available for narrowband communications with a BS. The apparatus also includes means for selecting at least one of the plurality of narrowband resources to monitor for a paging message from the BS based, at least in part, on a current coverage level of the apparatus and a past coverage level of the apparatus. The apparatus further includes means for monitoring for the paging message in the selected narrowband resource.

Certain aspects of the present disclosure provide an apparatus for wireless communication. The apparatus generally includes at least one processor, and a memory coupled to the at least one processor. The at least one processor is configured to determine a plurality of resources available for narrowband communications with a BS. The at least one processor is also configured to select at least one of the plurality of narrowband resources to monitor for a paging message from the BS based, at least in part, on a current coverage level of the apparatus and a past coverage level of the apparatus. The at least one processor is further configured to monitor for the paging message in the selected narrowband resource.

Certain aspects of the present disclosure provide a computer-readable medium having computer executable code stored thereon. The computer executable code generally includes code for determining, by a UE, a plurality of resources available for narrowband communications with a BS. The computer executable code also includes code for selecting, by the UE, at least one of the plurality of narrowband resources to monitor for a paging message from the BS based, at least in part, on a current coverage level of the apparatus and a past coverage level of the apparatus. The computer executable code further includes code for monitoring, by the UE, for the paging message in the selected narrowband resource.

Certain aspects of the present disclosure provide a method for wireless communications performed by a BS. The method generally includes determining one or more repetition levels for transmitting paging messages to a UE. Each of the repetition levels corresponds to a different set of resources available for narrowband communications with the UE. The method also includes transmitting the paging messages at the determined repetition levels.

Certain aspects of the present disclosure provide an apparatus for wireless communications. The apparatus generally includes means for determining one or more repetition levels for transmitting paging messages to a UE. Each of the repetition levels corresponds to a different set of resources available for narrowband communications with the UE. The apparatus also includes means for transmitting the paging messages at the determined repetition levels.

Certain aspects of the present disclosure provide an apparatus for wireless communication. The apparatus generally includes at least one processor, and a memory coupled to the at least one processor. The at least one processor is configured to determine one or more repetition levels for transmitting paging messages to a UE. Each of the repetition levels corresponds to a different set of resources available for narrowband communications with the UE. The at least one processor is also configured to transmit the paging messages at the determined repetition levels.

Certain aspects of the present disclosure provide a computer-readable medium having computer executable code stored thereon. The computer executable code generally includes code for determining, by a BS, one or more repetition levels for transmitting paging messages to a UE. Each of the repetition levels corresponds to a different set of resources available for narrowband communications with the UE. The computer executable code generally includes code for transmitting, by the BS, the paging messages at the determined repetition levels.

Certain aspects of the present disclosure provide a method for wireless communications performed by a BS. The method generally includes receiving a narrowband physical random access channel (NPRACH) preamble in a resource block within a set of resource blocks available for narrowband communications with a UE. The method also includes determining another resource block within the set of resource blocks for transmitting a random access response message based at least in part on a location of the resource block in which the NPRACH preamble was received. The method further includes transmitting the random access response message in the determined other resource block.

Certain aspects of the present disclosure provide an apparatus for wireless communications. The apparatus generally includes means for receiving a narrowband physical random access channel (NPRACH) preamble in a resource block within a set of resource blocks available for narrowband communications with a UE. The apparatus also includes means for determining another resource block within the set of resource blocks for transmitting a random access response message based at least in part on a location of the resource block in which the NPRACH preamble was received. The apparatus further includes means for transmitting the random access response message in the determined other resource block.

Certain aspects of the present disclosure provide an apparatus for wireless communication. The apparatus generally includes at least one processor, and a memory coupled to the at least one processor. The at least one processor is configured to receive a narrowband physical random access channel (NPRACH) preamble in a resource block within a set of resource blocks available for narrowband communications with a UE. The at least one processor is also configured to determine another resource block within the set of resource blocks for transmitting a random access response message based at least in part on a location of the resource block in which the NPRACH preamble was received. The at least one processor is further configured to transmit the random access response message in the determined other resource block.

Certain aspects of the present disclosure provide a computer-readable medium having computer executable code stored thereon. The computer executable code generally includes code for receiving, by a BS, a narrowband physical random access channel (NPRACH) preamble in a resource block within a set of resource blocks available for narrowband communications with a UE. The computer executable code also includes code for determining, by the BS, another resource block within the set of resource blocks for transmitting a random access response message based at least in part on a location of the resource block in which the NPRACH preamble was received. The computer executable code further includes code for transmitting, by the BS, the random access response message in the determined other resource block.

Certain aspects of the present disclosure provide a method for wireless communications performed by a BS. The method generally includes determining a first set of resources for transmission of narrowband physical random access channel (NPRACH) signals by one or more UEs. The first set of resources are partitioned between a first type and second type of the UEs. The method also includes determining a second set of resources for the transmission of NPRACH signals by the second type of UEs. The method further includes providing an indication of the first and second set of resources.

Certain aspects of the present disclosure provide an apparatus for wireless communications. The apparatus generally includes means for determining a first set of resources for transmission of narrowband physical random access channel (NPRACH) signals by one or more UEs. The first set of resources are partitioned between a first type and second type of the UEs. The apparatus also includes means for determining a second set of resources for the transmission of NPRACH signals by the second type of UEs. The apparatus further includes means for providing an indication of the first and second set of resources.

Certain aspects of the present disclosure provide an apparatus for wireless communication. The apparatus generally includes at least one processor, and a memory coupled to the at least one processor. The at least one processor is configured to determine a first set of resources for transmission of narrowband physical random access channel (NPRACH) signals by one or more UEs. The first set of resources are partitioned between a first type and second type of the UEs. The at least one processor is also configured to determine a second set of resources for the transmission of NPRACH signals by the second type of UEs. The at least one processor is further configured to provide an indication of the first and second set of resources.

Certain aspects of the present disclosure provide a computer-readable medium having computer executable code stored thereon. The computer executable code generally includes code for determining, by a BS, a first set of resources for transmission of narrowband physical random access channel (NPRACH) signals by one or more UEs. The first set of resources are partitioned between a first type and second type of the UEs. The computer executable code also includes code for determining, by the BS, a second set of resources for the transmission of NPRACH signals by the second type of UEs. The computer executable code further includes code for providing, by the BS, an indication of the first and second set of resources.

Certain aspects of the present disclosure provide a method for wireless communications performed by a UE. The method generally includes receiving an indication of a set of resources within a plurality of resources for transmitting NPRACH signals to a BS. The indication of the set of resources is based at least in part on a type of the UE. The method also includes transmitting NPRACH signals to the BS using the indicated set of resources.

Certain aspects of the present disclosure provide an apparatus for wireless communications. The apparatus generally includes means for receiving an indication of a set of resources within a plurality of resources for transmitting NPRACH signals to a BS. The indication of the set of resources is based at least in part on a type of the apparatus. The apparatus also includes means for transmitting NPRACH signals to the BS using the indicated set of resources.

Certain aspects of the present disclosure provide an apparatus for wireless communication. The apparatus generally includes at least one processor, and a memory coupled to the at least one processor. The at least one processor is configured to receive an indication of a set of resources within a plurality of resources for transmitting NPRACH signals to a BS. The indication of the set of resources is based at least in part on a type of the apparatus. The at least one processor is also configured to transmit NPRACH signals to the BS using the indicated set of resources.

Certain aspects of the present disclosure provide a computer-readable medium having computer executable code stored thereon. The computer executable code generally includes code for receiving, by a UE, an indication of a set of resources within a plurality of resources for transmitting NPRACH signals to a BS. The indication of the set of resources is based at least in part on a type of the UE. The computer executable code also includes code for transmitting, by the UE, NPRACH signals to the BS using the indicated set of resources.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A and 5B illustrate an example of MTC co-existence within a wideband system, such as LTE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
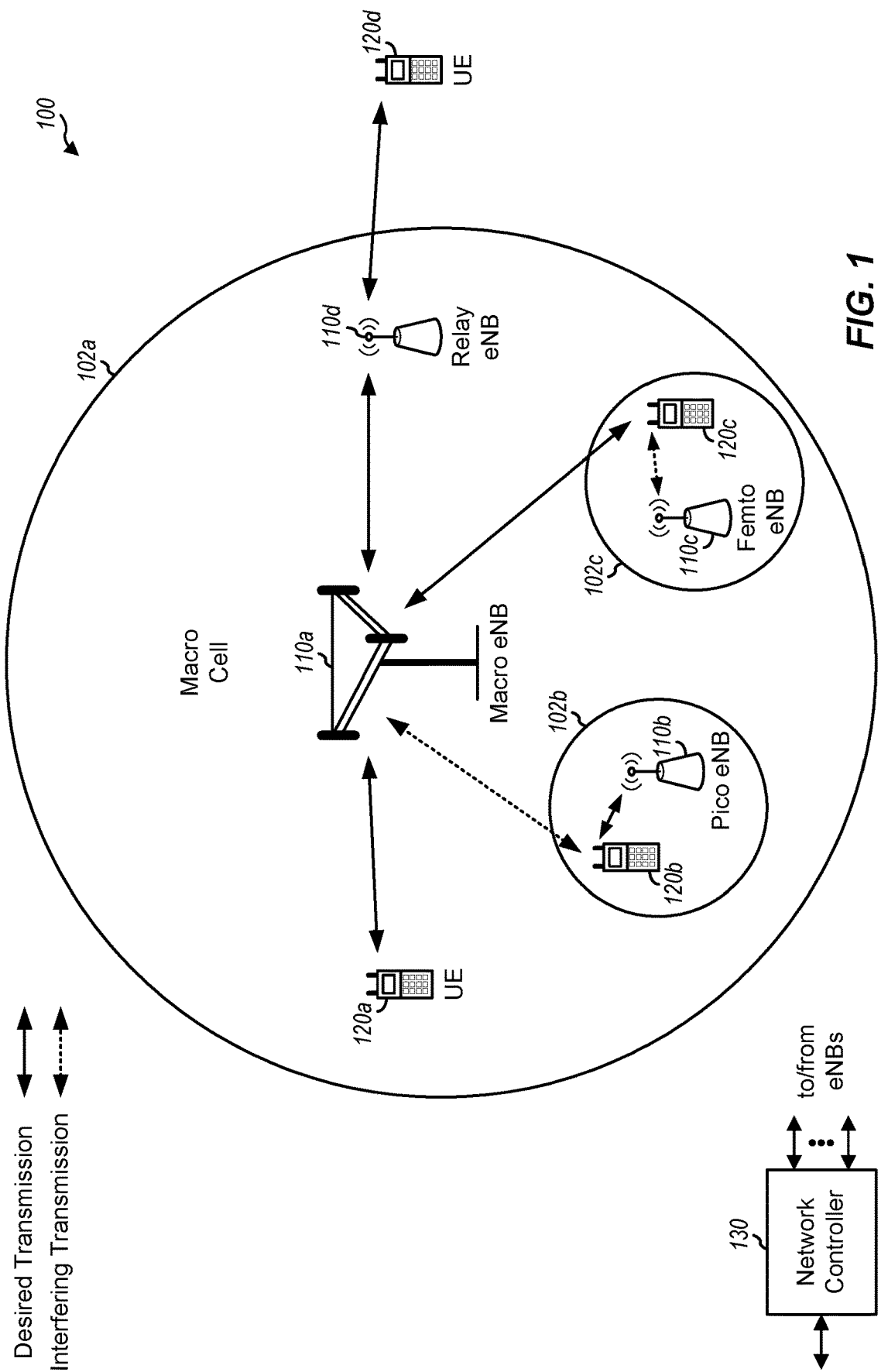
FIG. 1 is a block diagram conceptually illustrating an example of a wireless communication network, in accordance with certain aspects of the present disclosure.

Certain aspects of the present disclosure generally relate to paging and random access procedures for narrowband (NB) internet-of-things (IoT). More specifically, aspects of the present disclosure provide techniques for performing paging and/or random access procedures for NB-IoT using multiple physical resource blocks (PRBs).

According to certain aspects, a base station (BS) may determine multiple sets of resources that are available for narrowband communications with UEs (e.g., IoT devices, legacy devices, etc.). The BS may determine an allocation of the available sets of resources to one or more of the UEs based, at least in part, on a type (or capability) of each UE. A type of a UE, for example, may refer to a version of a standard supported by the UE (e.g., whether the UE is a legacy UE, narrowband UE, advanced UE, etc.), one or more capabilities of the UE (e.g., whether the UE supports multiple PRB operations for NB-IoT, whether the UE supports single tone/multi-tone transmission, etc.), etc.

Once the allocation is determined, the BS may signal an indication of the allocation to the UEs. The UEs, in turn, may use the indicated allocation to determine which of the multiple different sets of available narrowband resources to use for communication with the BS. In one reference example, a UE can use the indication to determine a set of resources to monitor for paging messages from the BS. In one reference example, a UE can use the indication to determine a set of resources to use for a narrowband physical random access (NPRACH) procedure.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation. These communications networks are merely listed as examples of networks in which the techniques described in this disclosure may be applied; however, this disclosure is not limited to the above-described communications networks. The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, virtual reality goggles, smart ring, smart clothing), displays (e.g., heads-up displays), healthcare devices, medical devices, vehicular devices, navigation devices, entertainment devices (e.g., music players, game consoles), etc. Some UEs may be considered machine-type communication (MTC) UEs, which may include remote devices, such as drones, robots, sensors, meters, location tags, monitors, cameras, etc., that may communicate with a base station, another remote device, or some other entity. Machine type communications (MTC) may refer to communication involving at least one remote device on at least one end of the communication and may include forms of data communication which involve one or more entities that do not necessarily need human interaction. UEs may include internet-of-things (IoT) (e.g., NB-IoT) devices.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, techniques presented herein may be used to perform paging and/or random access operations for narrowband IoT with multiple PRBs. In aspects, one or more of the UEs 120 (e.g., IoT devices) in the network 100 may have capabilities that are different compared to other UEs 120 in the network 100. In one example, some of the UEs 120 may have the capability to support multiple PRB operations (e.g., operations in an anchor PRB and one or more non-anchor PRBs) for NB IoT, whereas some of the UEs 120 may have the capability to support single PRB operations (e.g., operations in an anchor PRB) for narrowband IoT.

In aspects, a base station (e.g., eNB 110) may determine different sets of resources that are available for narrowband communications with one or more different sets of UEs 120 (e.g., IoT devices). Each set of UEs 120 may include UEs of a particular type (or capability) (e.g., such as whether the UEs support multiple PRB operations for NB IoT). The eNB 110 may allocate the different sets of resources to the UEs 120 in the different sets based, at least in part, on the type of UEs 120. The eNB 110 may signal an indication of the allocation to the UEs 120.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, wearables (e.g., smart watch, smart bracelet, smart glasses, virtual reality goggles, smart ring, smart clothing), gaming devices, entertainment devices, cameras, music players, medical/healthcare devices, vehicular devices, navigation/positioning devices, etc. MTC UEs may include remote devices, such as drones, robots/robotic devices, sensors, meters, cameras, monitors, location tags, etc., that may communicate with a base station, another remote device, or some other entity. MTC devices, as well as other types of devices, may include internet of everything (IoE) or IoT devices, such as NB-IoT devices, and techniques disclosed herein may be applied to MTC devices, NB-IoT devices, as well as other devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12 and beyond, e.g., 5G releases) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/ 3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
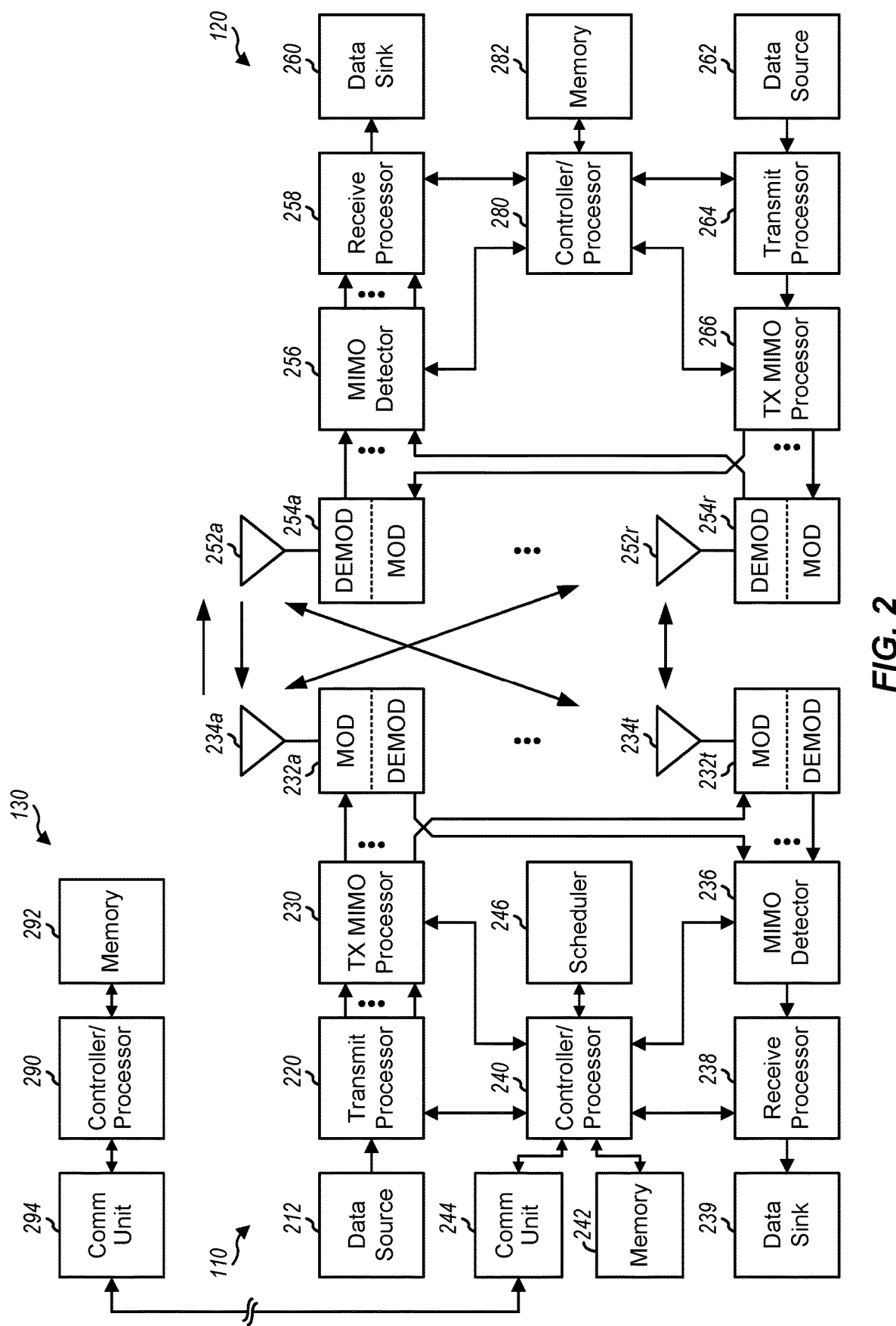
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS/eNB 110 and UE 120, which may be one of the BSs/eNBs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for paging and/or random access procedures for narrowband IoT with multiple PRBs. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120 may perform or direct operations 700 in FIG. 7, operations 900 in FIG. 9, operations 1300 in FIG. 13, and/or other processes for the techniques described herein. Similarly, controller/processor 240 and/or other controllers/processors and modules at BS 110 may perform or direct operations 600 in FIG. 6, operations 800 in FIG. 8, operations 1000 in FIG. 10, operations 1100 in FIG. 11 operations 1200 in FIG. 12, and/or other processes for the techniques described herein. Memories 242 and 282 may store data and program codes for base station 110 and UE 120, respectively. A scheduler 246 may schedule UEs for data transmission on the downlink and/or uplink.

Figure 3:
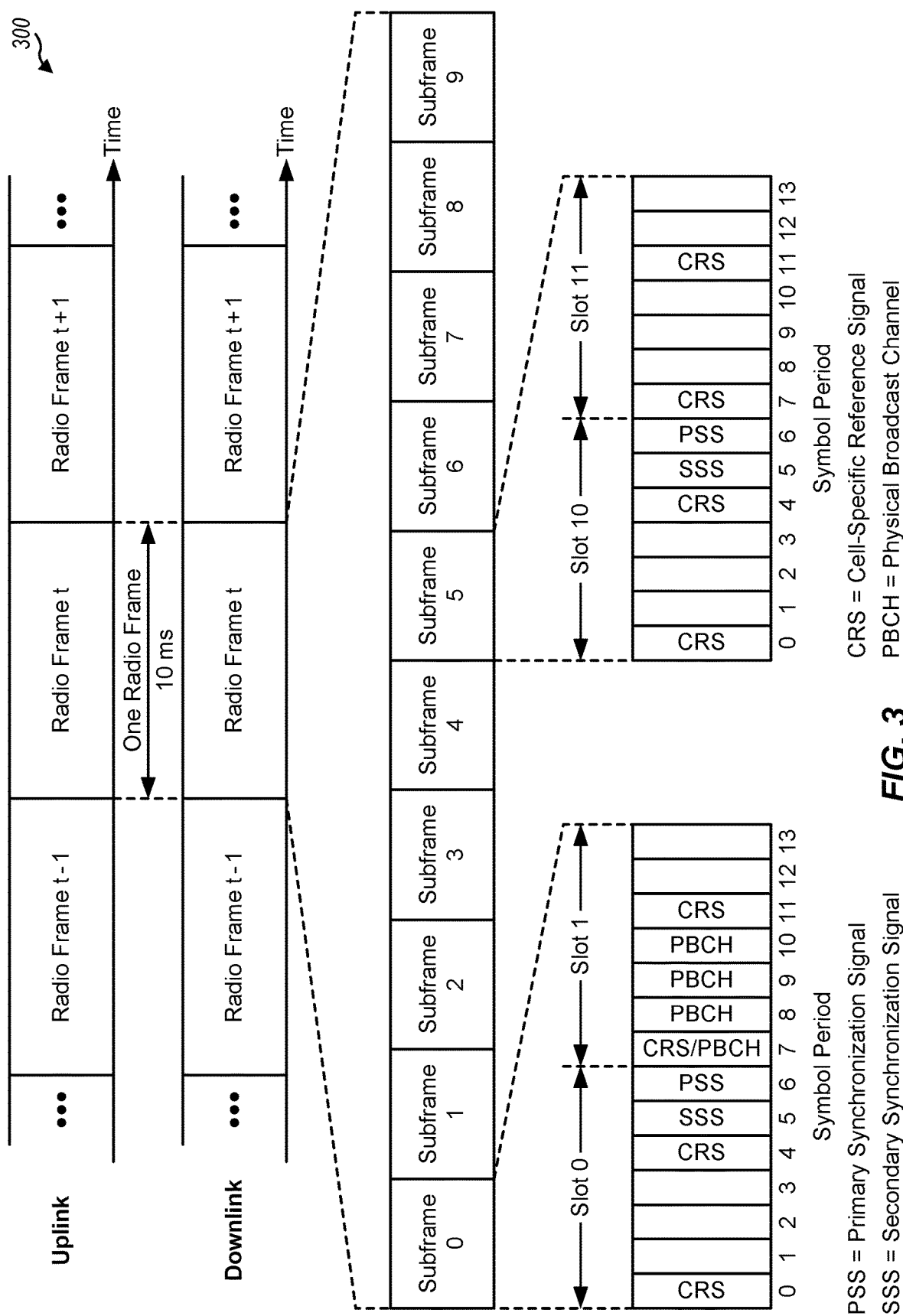
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
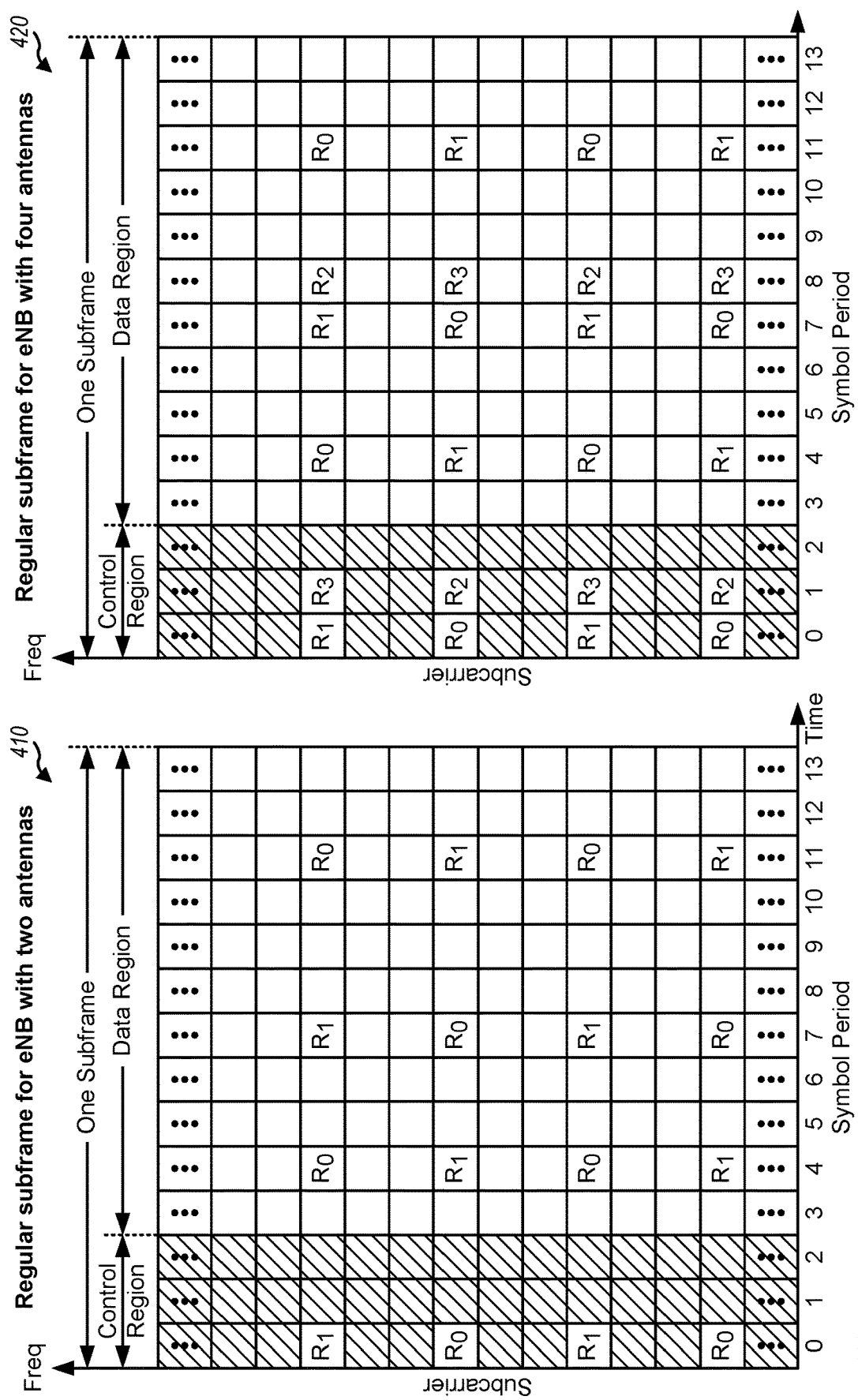
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed. In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB. eMTC UEs may support narrowband operation while operating in a wider system bandwidth (e.g., 1.4/3/5/10//15/20 MHz). Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRBs). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

FIGS. 5A and 5B illustrate examples of how UEs in MTC and/or eMTC operation may co-exist within a wideband system (e.g., 1.4/3/5/10/15/20 MHz), such as LTE. As illustrated in the example frame structure of FIG. 5A, subframes 510 associated with MTC and/or eMTC operation may be time division multiplexed (TDM) with regular subframes 520 associated with LTE (or some other RAT). Additionally or alternatively, as illustrated in the example frame structure of FIG. 5B, one or more narrowband regions 560, 562 used by narrowband UEs may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, such as LTE Release 13, each eMTC UE (e.g., Cat M1 UEs) may operate (e.g., monitor/receive/transmit) within one narrowband region (e.g., at 1.4 MHz or 6 RBs) at a time. In other cases, such as LTE Release 14, eMTC UEs may operate on a 5 MHz narrowband region (e.g., using 25 RBs).

At any given time, eMTC UEs may re-tune to other narrowband regions in the wider system bandwidth. That is, an eMTC UE may switch or hop between multiple narrowband regions in order to reduce interference. In some examples, multiple eMTC UEs may be served by the same narrowband region. In yet other examples, different combinations of eMTC UEs may be served by one or more same narrowband regions and/or one or more different narrowband regions.

As shown, the eMTC UEs may operate (e.g., monitor/receive/transmit) within the narrowband regions for various different operations. For example, as shown in FIG. 5B, a first narrowband region 560 of a subframe 552 may be monitored by one or more eMTC UEs for either a PSS, SSS, PBCH, MTC signaling, or paging transmission from a BS in the wireless communication network. As also shown in FIG. 5B, a second narrowband region 562 of a subframe 554 may be used by eMTC UEs to transmit a RACH or data previously configured in signaling received from a BS. In some cases, the second narrowband region may be utilized by the same UEs that utilized the first narrowband region (e.g., the UEs may have re-tuned to the second narrowband region to transmit after monitoring in the first narrowband region). In some cases (although not shown), the second narrowband region may be utilized by different UEs than the UEs that utilized the first narrowband region. Although the examples described herein assume a narrowband of 6 RBs, those skilled in the art will recognize that the techniques presented herein may also be applied to different sizes of narrowband regions (e.g., 25 RBs).

The wireless communication network (e.g., LTE Release 13, or greater) may support deployments using one physical resource block (PRB) (e.g., 180 kHz+20 kHz guard band) for narrowband operation (e.g., NB-IoT) with different deployment modes. In one example, narrowband operations may be deployed in-band, for example, using resource blocks within a wider system bandwidth. In one case, narrowband operations may use one resource block within the wider system bandwidth of an LTE network. In this case, the 180 kHz bandwidth for the resource block may have to be aligned with a wideband LTE resource block. In one example, narrowband operations may be deployed in a standalone mode of operation. In one example, narrowband operations may be deployed in the unused resource blocks within a LTE carrier guard-band. In this deployment, the 180 kHz RB within the guard band may have to be aligned with a 15 kHz tone grid of wideband LTE, for example, in order to use the same FFT and/or reduce interference of in-band legacy LTE communications.

In some wireless networks (e.g., LTE Release 13), one PRB of the NB-IoT resources can be used as an "anchor PRB" for one or more narrowband operations. For example, narrowband primary synchronization signals (PSS), narrowband secondary synchronization signals (SSS), master information block (MIB), system information block (SIB), random access messages, paging messages, etc., can be transmitted on the anchor PRB. Further, once a given UE is connected mode, the UE can move to a different PRB (e.g., non-anchor PRB) for other operations.

Certain standards (e.g., LTE Release 14, or greater) may introduce support for various additional NB-IoT enhancements. For example, such standards may allow devices (e.g., NB-IoT devices) in the wireless network to perform certain operations (e.g., such as transmitting NPRACH signals, monitoring for paging messages, etc.) on an anchor PRB and/or on one or more non-anchor PRBs. While the transmission/reception of narrowband paging messages and/or NPRACH signals on non-anchor PRBs can increase the capacity of the network for UEs in connected mode, such may not be the case for UEs in idle mode that are able to perform similar operations in non-anchor PRBs. Put differently, current techniques that idle UEs may use to choose resources for narrowband operations (e.g., attempting to access a cell by random access, monitoring for paging messages to obtain information from the cell, etc.) in the network may lead to an unequal distribution of resources among the UEs in the network.

For example, in eMTC, UEs may use the following Equation (1) to determine the paging narrowband (PNB) to monitor for a paging message transmitted from a base station:

$$PNB = floor(UE\_ID)/(N*Ns)) \bmod Nn \quad (1)$$

where N is the min(T,nB), Ns is the max (1,nB/T), Nn is the number of paging narrowbands (e.g., provided in system information), T is the DRX cycle of the UE, and nB is one of 4T, 2T, T, T/4, T/8, T/16, T/32. In eMTC, the use of equation (1) may lead to an even split of UEs among different narrowbands. In one example, assuming there are 100 UEs and two narrowbands, then 50 UEs would monitor one narrowband for paging messages and 50 UEs would monitor the other narrowband for paging messages.

However, while an equal distribution of resources among UEs can be obtained with equation (1) for eMTC, the use of the above equation may lead to an unequal split of narrowbands among different types of UEs (e.g., Rel-13 UEs, Rel-14 UEs, etc.) for NB-IoT, due, in part, to certain UEs (e.g., Rel-13 UEs) being unable to perform certain NB-IoT operations (e.g., paging, random access, etc.) in non-anchor PRBs.

For example, assume there are two PRBs (e.g., an anchor PRB and a non-anchor PRB) available for monitoring for paging messages from a base station. Further, assume that 50% of the UEs in the network are of one type (e.g., Rel-13 UEs) and the other 50% of the UEs in the network are of a different type (e.g., Rel-14 UEs). In such an example, with the use of equation (1), all of the Rel-13 UEs would monitor for paging messages in the anchor PRB, half of the Rel-14 UEs would monitor for paging messages in the anchor PRB, and the other half of the Rel-14 UEs would monitor for paging messages in the non-anchor PRB, resulting in 75% of the UEs monitoring for paging messages in the anchor PRB and 25% of the UEs monitoring for paging messages in the non-anchor PRB. Such an unequal distribution of narrowband resources among UEs may be undesirable for efficient operations in NB-IoT. Note, that the above scenario is merely one example of how conventional techniques for choosing resources for narrowband operations can lead to an unequal distribution of resources in the network. More generally, those skilled in the art will recognize that the above example may be extended to other values and to other narrowband operations (e.g., such as a random access procedure where the UE chooses a NPRACH resource that contains tone in addition to PRB).

Accordingly, aspects presented herein provide techniques for efficiently distributing narrowband resources to UEs, which may include UEs of different types (or capabilities), for multiple PRB operations in NB-IoT.

Figure 6:
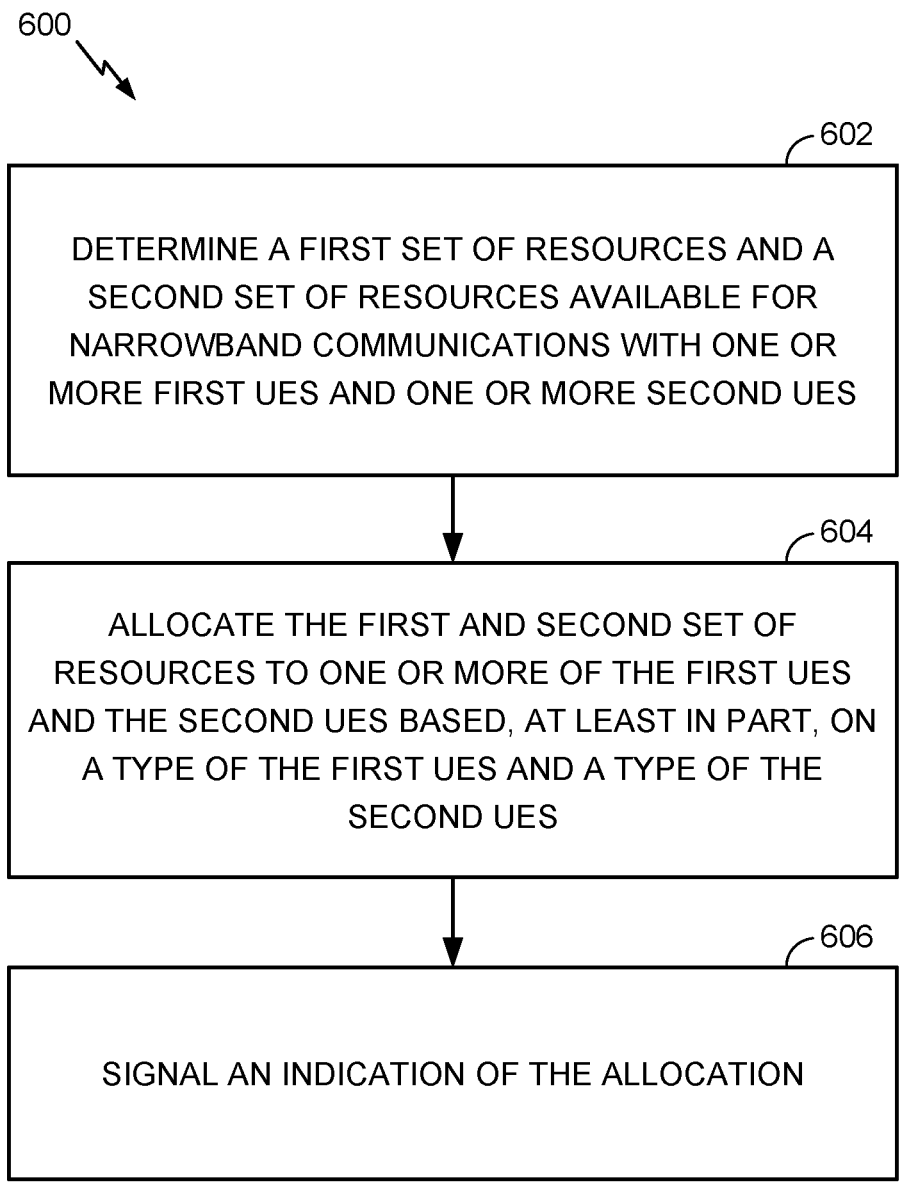
FIG. 6 is a flow diagram illustrating example operations for wireless communications by a base station (BS), in accordance with certain aspects of the present disclosure.

FIG. 6 is a flow diagram illustrating example operations 600 for wireless communications, in accordance with certain aspects of the present disclosure. The operations 600 may be performed, for example, by a BS (e.g., eNB 110). The operations 600 may begin, at 602, where the BS determines a first set of resources and a second set of resources available for narrowband communications with one or more first UEs and one or more second UEs. At 604, the BS allocates the first and second set of resources to one or more of the first UEs and the second UEs based, at least in part, on a type of the first UEs and a type of the second UEs. At 606, the BS signals an indication of the allocation.

In one aspect, the BS may communicate with the first and second UEs using the first and second set of resources. In one reference example, the first and second set of resources may include paging resources, and the BS may transmit narrowband paging messages on the paging resources. In one reference example, the first and second set of resources may include NPRACH resources, and the BS may monitor for NPRACH preamble(s) transmitted on the NPRACH resources.

Figure 7:
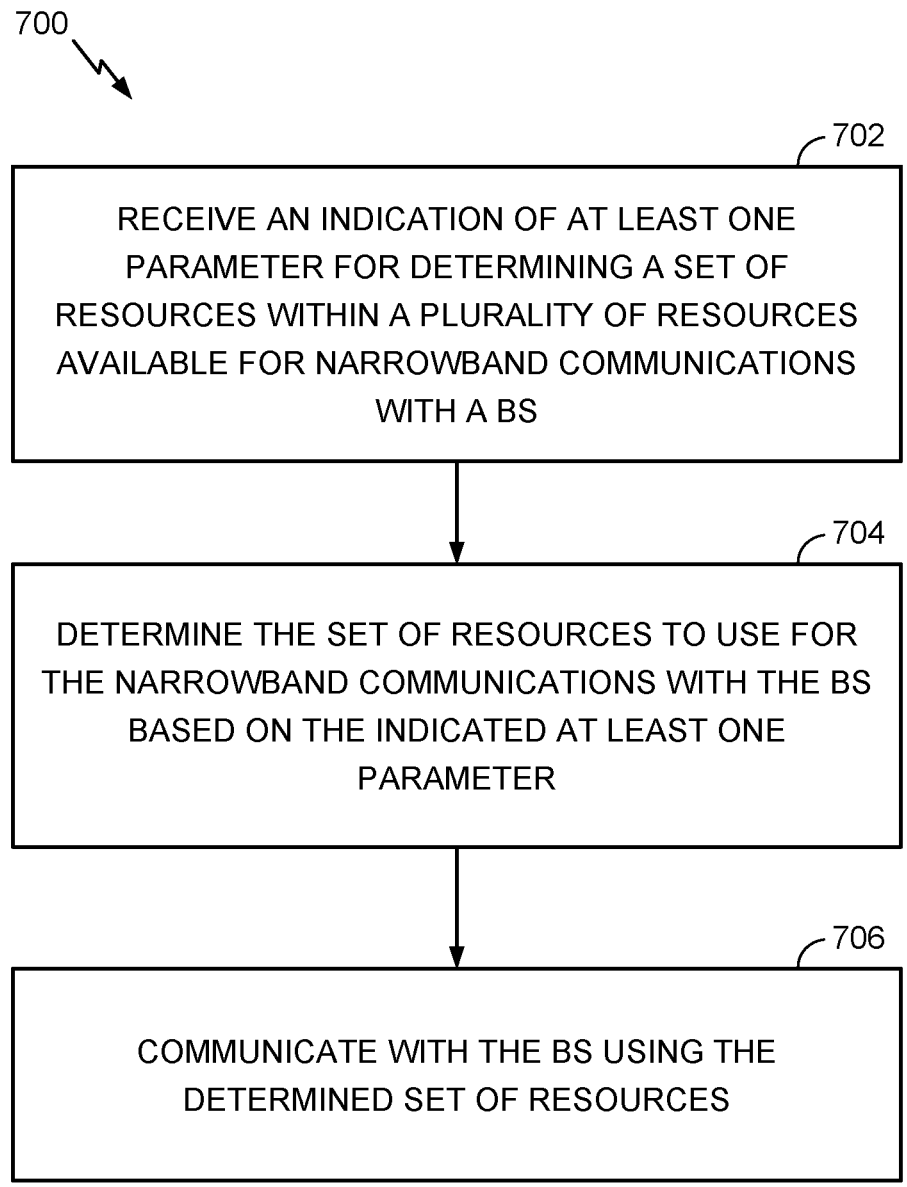
FIG. 7 is a flow diagram illustrating example operations for wireless communications by a UE, in accordance with certain aspects of the present disclosure.

FIG. 7 is a flow diagram illustrating example operations 700 for wireless communications, in accordance with certain aspects of the present disclosure. The operations 700 may be performed, for example, by a UE (e.g., UE 120) such as an NB-IoT device. The operations 700 may begin, at 702, where the UE receives an indication of at least one parameter for determining a set of resources within a plurality of resources available for narrowband communications with a BS. The at least one parameter may be based on a type of the UE. At 704, the UE determines the set of resources to use for narrowband communications with the BS based on the indicated at least one parameter. At 706, the UE communicates with the BS using the determined set of resources. In one aspect, the resources are paging resources, and the UE may monitor for paging channels on the paging resources. In one aspect, the resources are NPRACH resources, and the UE may transmit a NPRACH preamble on the NPRACH resources.

According to certain aspects, each set of resources may include resources in one or more narrowband PRBs. In one aspect, for example, one set of resources (e.g., first set of resources) can include a single anchor PRB, and another set of resources (e.g., second set of resources) can include one or more non-anchor PRBs. Each set of UEs may include UEs of a particular type (or UEs that have one or more similar capabilities). For example, a given set of one or more UEs may include UEs that support a particular version of a specification (e.g., Rel-13, Rel-14, etc.), have the capability to perform narrowband operations (e.g., paging, random access, etc.) in non-anchor PRBs, have the capability to perform narrowband operations in anchor PRBs, etc.

In an aspect, the BS may allocate the first set of resources to the first UEs of a first type. For example, the BS may determine that the first set of resources (e.g., an anchor PRB) is capable of being used by UEs that have the capability to perform paging/random access procedures for NB-IoT in an anchor PRB (e.g., such as Rel-13 UEs). In an aspect, the BS may allocate the first and second set of resources to the second UEs of the second type. For example, the BS may determine that the first and second set of resources (e.g., an anchor PRB and one or more non-anchor PRBs) are capable of being used by UEs that can perform paging/random access procedures for NB-IoT in anchor PRBs and/or non-anchor PRBs (e.g., such as Rel-14 UEs, or later).

According to certain aspects, the BS may allocate the different sets of resources to one or more of the first and second UEs by determining one or more parameters for distributing the anchor and non-anchor PRBs among the different types of UEs. The at least one parameter may be indicative of the fraction of UEs in the second type of UEs (e.g., Rel-14 UEs) that may be allocated to the first set of resources (e.g., anchor PRB). For example, for Rel-14 UEs and greater, the BS may determine a parameter X, such that X % of Rel-14 UEs monitor paging in the anchor PRB, and 100-X % of Rel-14 UEs monitor paging in non-anchor PRB(s). The BS may determine and broadcast the value of such parameter implicitly or explicitly. In one aspect, the at least one parameter may not be received by the first type of UEs. Although paging is used in this example, the parameter X may also be determined for random access procedures.

In one aspect, the BS may determine the parameter based on an amount (or number) of UEs of a particular type. For example, if the BS determines there is a large number of Rel-14 (or greater) UEs in the network, the BS may determine a value of X around 50 (e.g., such that the Rel-14 UEs are more evenly distributed among anchor and non-anchor PRBs). On the other hand, if the BS determines there is a majority of Rel-13 UEs in the network, the BS may determine a value of X around 0 (e.g., such that all Rel-14 UEs would be paged in the non-anchor). More generally, however, the BS may determine an optimal value of X that evenly distributes the different UEs across the different sets of resources.

Additionally or alternatively, in one aspect, the BS may determine the value of the parameter X based on the load in the network for each type of UE. For example, assume half of the UEs in the network are of a first type (e.g., Rel-13 UEs) and the other half are of a second type (e.g., Rel-14 UEs). In such an example, if the BS determines that more paging messages and/or more repetitions are needed to reach the first type of UEs (e.g., as compared to the second type of UEs, or vice versa), the BS can account for the difference in the load between the two types of UEs when determining the parameter X. In this manner, even if there are an equal amount of UEs of different types, the BS can determine an optimal value for X that efficiently distributes the resources among the UEs in the network.

Once the parameter is determined, the BS may signal an indication of the at least one parameter to the UEs. In one aspect, the BS may signal the value of such parameter to certain types of UEs. For example, the BS may signal the parameter X to Rel-14 UEs (e.g., second UEs), but not to Rel-13 UEs (e.g., first UEs) (e.g., it may be implicitly known that Rel-13 UEs perform paging/random access operations in the anchor PRB). In some examples, the parameters may be signaled via broadcast signaling.

In one aspect, the one or more parameters used to allocate (or distribute) the resources to the different UEs may be based on one or more weights determined by the BS. For example, a first one or more weights may be associated with the first set of resources and a second one or more weights may be associated with the second set of resources. The BS may assign a multiplicity or weight to each of the PRBs in order to allocate the PRBs among the UEs with different probability. Assume, for example, that there are two PRBs, RB0 and RB1, where RB0 is the anchor PRB and RB1 is the non-anchor PRB. In this example, the BS may assign a weight of one to RB0 and a weight of two to RB1 in order to generate three virtual RB (VRBs). Once assigned, the BS may transmit an indication of the weights to the UEs. Each UE, in turn, can select randomly (e.g., for random access procedures) or based on UE_ID (e.g., for paging messages) among the three virtual RB. In one aspect, the UE may use the following equation (2) to select the VRB to use for NB-IoT operations:

$$VRB = \text{floor}(UE\_ID/(N*Ns)) \bmod Nn \quad (2)$$

where N is the min(T, nB), Ns is the max (1, nB/T), Nn is the number of "virtual RBs" for paging (or random access messages) (e.g., $Nn = \Sigma w_i$, with $w_i$ being the weight for the i-th RB), T is the DRX cycle of the UE, and nB is one of 4T, 2T, T, T/4, T/8, T/16, T/32.

Once the UE selects a VRB, the UE may map the VRB to the actual PRB. Continuing with the above example, the UE may map VRB0 to RB0 and VRB1/2 to RB1. In this manner, the BS can determine and assign different weights to each of the different resources (e.g., as one of the parameters) in order to allocate the resources among the UEs with different probability. In this particular mapping, for example, the UE has a 66% probability of selecting RB1 and a 33% probability of selecting RB0. Note that while two PRBs were used in the above reference example, those of ordinary skill in the art will recognize that the above weights can be determined for any number of anchor and/or non-anchor PRBs.

In one aspect, the one or more parameters used to allocate the resources to the different UEs may be based on a set of one or more threshold values. In one implementation, the BS may determine a set of thresholds [A,B,C] and generate a random number N between 1 and N (or 0 and N−1) to use for distributing resources among the different UEs. In some cases, instead of a random number N, the BS may generate a number based on UE_ID (e.g., for paging operations in NB-IoT). Once generated, the BS may transmit an indication of the thresholds to the UE. The UE may use the thresholds to select a resource (e.g., PRB) for one or more NB-IoT operations. For example, for paging operations in NB-IoT, the UE may generate a value X using equation (3). For NPRACH operations in NB-IoT, the UE may generate a value X using equation (4).

$$X = UE\_ID/K \mod N, \text{ for some } K > 1 \quad (3)$$

$$X = U(0, N-1) \quad (4)$$

Once generated, the UE may compare X with the indicated thresholds to determine which resource to use for operations in NB-IoT. In one case, for example, there may be four PRBs, RB0, RB1, RB2 and RB3, where RB0 is the anchor PRB and RB1-3 are non-anchor PRBs. In this example, if the UE determines X<A, the UE may select RB0; else if the UE determines X<B, the UE may select RB1; else if the UE determines X<C, the UE may select RB3; else the UE may select RB4. Further, in some aspects, the UE may determine to use RB0, e.g., if the UE is a legacy UE.

In one aspect, the one or more parameters may include one or more probability values for each of the first and second set of resources. The BS may transmit (or signal) explicit probability values for each of the resources to the UEs. For example, the BS may transmit an indication that a first percentage of UEs should use one set of resources, a second percentage of UEs should use another set of resources, and so on. The UEs may randomly select which resource to use according to the indicated probability value(s). In one reference example, assume there are three PRBs, RB0, RB1 and RB2, where RB0 is an anchor RB and RB1-RB2 are non-anchor RBs. In this case, the BS may signal a probability value X for RB0, such that the UE(s) have X probability of selecting RB0 for NB-IoT operations (e.g., random access procedures) and (1−X)/(number of non-anchor RBs) probability of selecting one of RB1-RB2 for NB-IoT operations.

In one aspect, the BS may signal an indication of the set of resources each type of UE should use for operations in NB-IoT. For example, the BS may signal a set of PRBs for Rel-14 UEs to monitor for paging messages transmitted from a BS. In some cases, the set of PRBs may contain the anchor PRB. In some cases, the set of PRBs may not contain the anchor PRB. Once signaled, the Rel-14 UE can choose uniformly between the PRBs in the set. For example, if 50% of the UEs are Rel-13 UEs and 50% of the UEs are Rel-14 UEs, all of the Rel-13 UEs may be paged in the anchor PRB (e.g., RB0). Continuing with this example, if the set of PRBs for Rel-14 is {RB1}, then all the Rel-14 UEs may monitor for paging messages in RB1.

Note that while many of the above examples refer one anchor PRB and one non-anchor PRB for paging in NB-IoT, those of ordinary skill in the art will recognize that the above techniques can be extended to multiple PRBs and other NB-IoT operations such as random access procedures.

According to certain aspects, the techniques presented herein may allow UEs (e.g., in LTE Release 14, or greater) in NB-IoT to receive different portions of narrowband paging messages in different PRBs. For example, narrowband paging messages may include a narrowband control portion (e.g., NPDCCH) and a narrowband data portion (e.g., NPDSCH). In one aspect, the BS may transmit the control portion of the narrowband paging message in an anchor PRB and transmit the corresponding data portion of the narrowband paging message in a different (non-anchor) PRB or the same PRB. The narrowband control portion may include an indication of the frequency location of the data portion.

Figure 8:
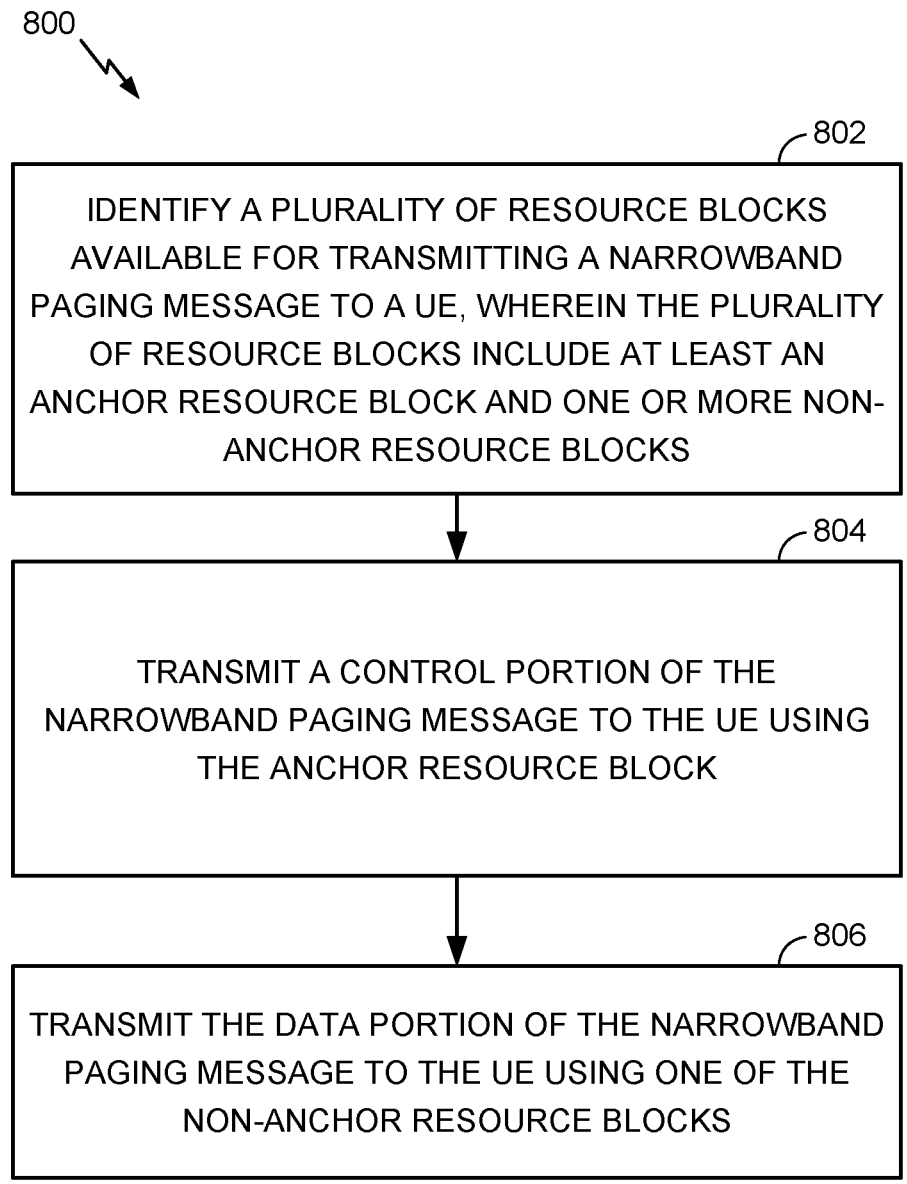
FIG. 8 is a flow diagram illustrating example operations for wireless communications by a BS, in accordance with certain aspects of the present disclosure.

FIG. 8 is a flow diagram illustrating example operations 800 for wireless communications, in accordance with certain aspects of the present disclosure. The operations 800 may be performed, for example, by a base station (e.g., eNB 110). The operations 800 may begin, at 802, where the BS identifies a plurality of resource blocks available for transmitting a narrowband paging message to a UE, wherein the plurality of resource blocks comprise at least an anchor resource block and one or more non-anchor resource blocks. At 804, the BS transmits a control portion of the narrowband paging message to the UE using the anchor resource block. At 806, the BS transmits a data portion of the narrowband paging message to the UE using one of the non-anchor resource blocks.

In some aspects, the BS may signal the PRB index (e.g., of the data portion) in the control portion of the paging message. In one example, a new field may be added to the downlink grant, and the BS may signal the PRB index in the new field. In some cases, however, adding a new field to the downlink grant may cause the size of the downlink grant to be different for legacy UEs compared to advanced IoT UEs (e.g., Rel-14 UEs). Thus, in another example, instead of adding a new field to the downlink grant, a new paging radio network temporary identifier (P-RNTI) or cyclic redundancy check (CRC) mask may be added. In such a case, legacy UEs (e.g., Rel-13 UEs) may monitor the legacy P-RNTI, and advanced IoT UEs (e.g., Rel-14 UEs) may monitor the legacy P-RNTI and new P-RNTI. In some aspects, the new P-RNTI PDSCH may be received in a different PRB. This PRB may be signaled in SIB.

According to certain aspects, paging messages may always be monitored in the anchor PRB (e.g., for system information updates). In such a case, a UE may monitor its own narrowband for some paging occasions and the anchor narrowband for other paging occasions. According to certain aspects, paging and/or random access operations in NB-IoT may use frequency hopping to achieve higher diversity. For example, the PRBs for paging or random access may be grouped into different groups with frequency hopping applied within each group. According to certain aspects, the determination of the PRB index for NB-IoT operations may be different for uplink and downlink. For example, the uplink PRB index may depend on the uplink bandwidth. Similarly, the downlink PRB index may depend on the downlink bandwidth.

According to certain aspects, a UE may determine the narrowband resources to monitor for paging messages transmitted from a BS based on a coverage level of the UE.

Figure 9:
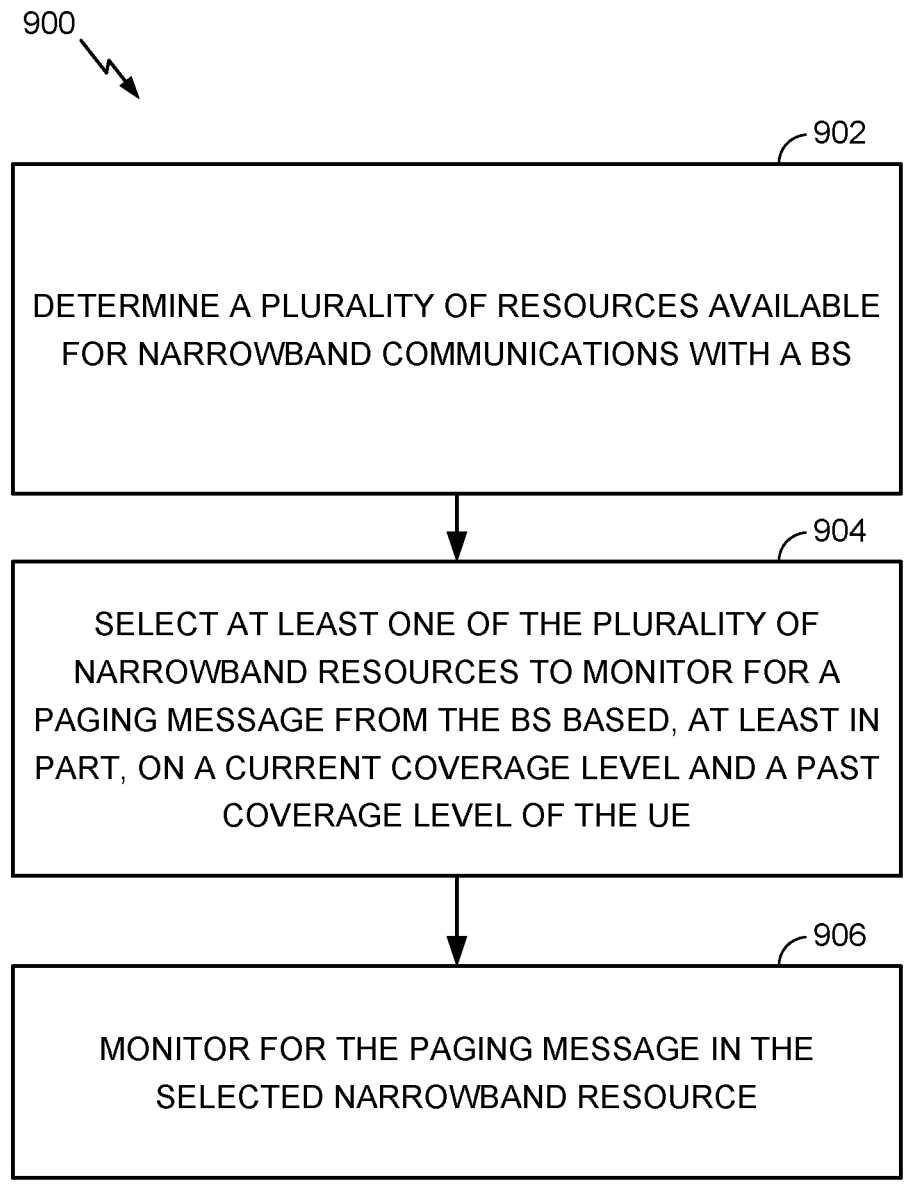
FIG. 9 is a flow diagram illustrating example operations for wireless communications by a UE, in accordance with certain aspects of the present disclosure.

FIG. 9 is a flow diagram illustrating example operations 900 for wireless communications, in accordance with certain aspects of the present disclosure. The operations 900 may be performed, for example, by a UE (e.g., UE 120) such as an NB-IoT device. The operations 900 may begin, at 902, where the UE determines a plurality of resources available for narrowband communications with a BS. At 904, the UE selects at least one of the plurality of narrowband resources to monitor for a paging message from the BS based, at least in part, on a current coverage level and a past coverage level of the UE. At 906, the UE monitors for the paging message in the selected narrowband resource.

In one aspect, a UE (e.g., Rel-14 UE) may select the coverage level based on its current coverage level M and last reported coverage level K. For example, the UE may receive (e.g., in a SIB) from a BS a mapping between the coverage level and narrowband paging resource. In one implementation, the UE may select the narrowband paging resource based on min (M,K). In such an example, if M>K, the UE may move to a narrowband with a better coverage level, e.g., move to coverage level M. However, in some cases, if the BS pings the UE in coverage level K, the UE may select to stay in coverage level K. In one example, if M<K, the UE may stay in coverage level K. In such cases, the BS may send the page, fail, and then try again in the other coverage enhancement level. The UE's last coverage level K may be stored by the MME.

According to certain aspects, techniques presented herein allow devices to send paging messages at different repetition levels in one or more different narrowbands.

Figure 10:
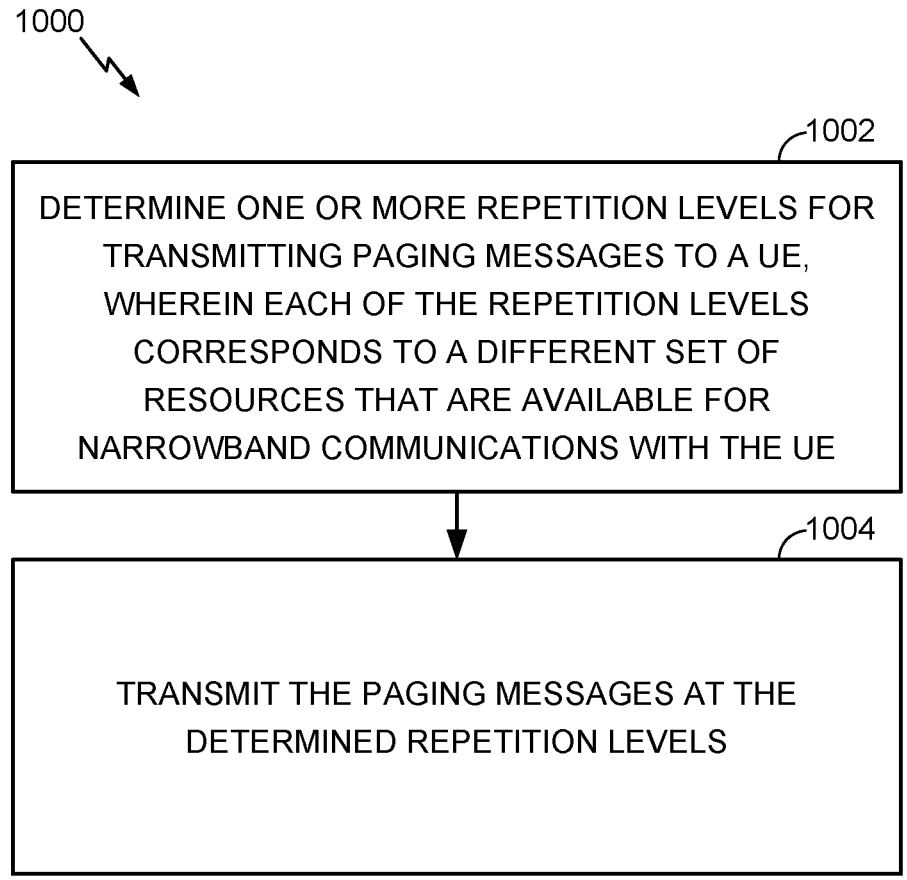
FIG. 10 is a flow diagram illustrating example operations for wireless communications by a BS, in accordance with certain aspects of the present disclosure.

FIG. 10 is a flow diagram illustrating example operations 1000 for wireless communications, in accordance with certain aspects of the present disclosure. The operations 1000 may be performed, for example, by a base station (e.g., eNB 110). The operations 1000 may begin, at 1002, where the BS determines one or more repetition levels for transmitting paging messages to a UE. Each of the repetition levels corresponds to a different set of resources that are available for narrowband communications with the UE. At 1004, the BS transmits the paging messages at the determined repetition levels.

In one aspect, the NPDCCH for paging messages may have different repetition levels that the UE monitors for. For example, the amount of repetition can be 8, 32, 128, 256, etc. In such cases, the BS may perform the repetition of the paging messages in different narrowbands, such that NPDCCH candidates with different repetitions are transmitted in different narrowbands. Further, the BS may perform time division multiplexing (TDM) between the different narrowbands when transmitting the paging messages. Doing so allows the UE to monitor one repetition level in one narrowband, then retune to the second narrowband to receive a second repetition level.

As mentioned above, in some cases, when a UE (e.g., IoT device) needs to connect with a cell to which the UE is not currently connected, the UE and cell may engage in an exchange of messages referred to as a RACH procedure. In a RACH procedure for NB-IoT (e.g., NRACH procedure), a UE transmits a NPRACH signal (or preamble) (sometimes referred to as Msg1 of the NRACH procedure) in a set of transmission resources reserved for NPRACH signals (e.g., using one or more of the techniques described above to select anchor and/or non-anchor PRBs for NPRACH preambles). Once transmitted, the cell responds to the NPRACH preamble with a narrowband random access response (NRAR) message (sometimes referred to as Msg2 of a NRACH procedure) carried on the narrowband downlink shared channel (NDL-SCH). The UE responds to the NRAR message with a narrowband RRC connection request message (sometimes referred to as Msg3 of a NRACH procedure), and the cell responds with a narrowband contention resolution message (sometimes referred to as Msg4 of a NRACH procedure). The UE is then connected with the cell.

According to certain aspects, techniques presented herein allow for the transmission of different messages (e.g., Msg1, Msg2, Msg3, etc.) of the NRACH procedure in one or more PRBs (e.g., which may include the anchor and/or non-anchor PRB).

Figure 11:
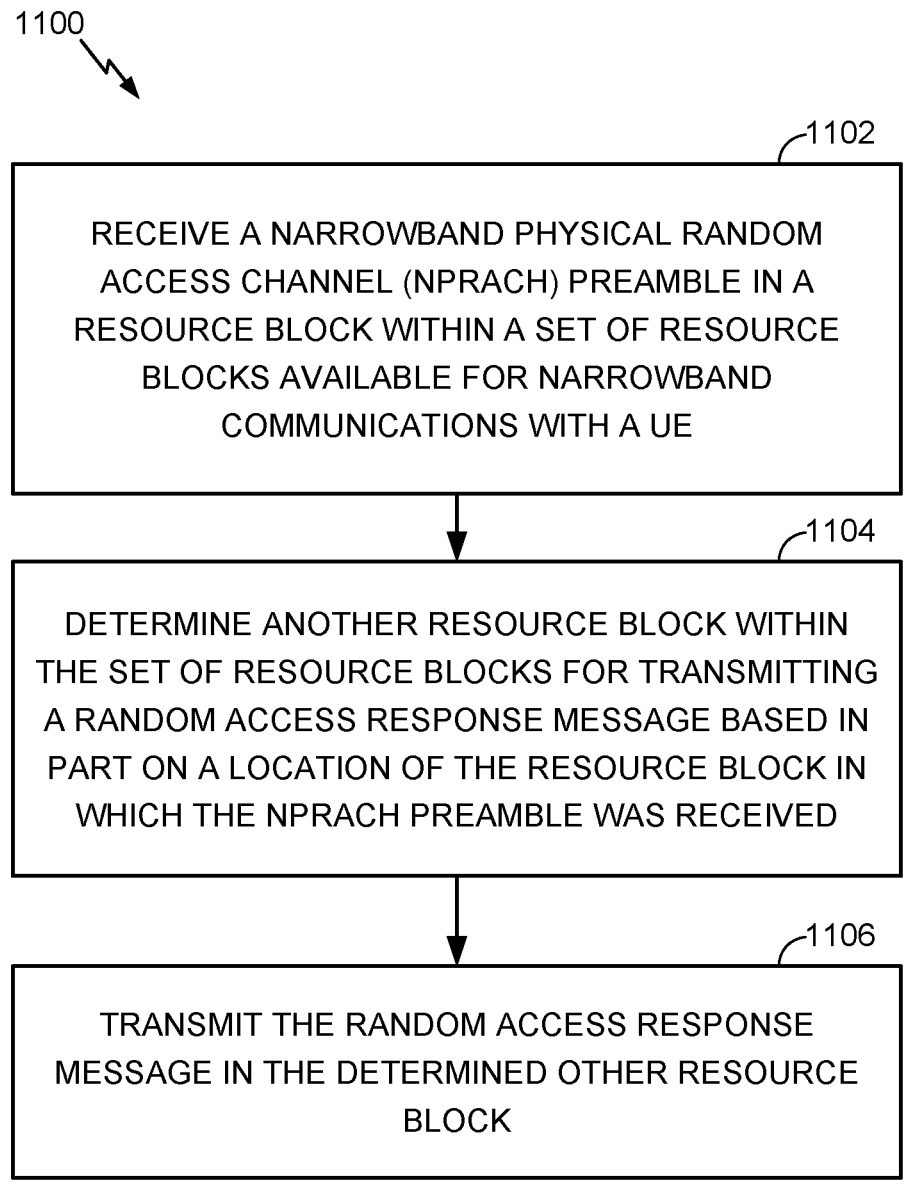
FIG. 11 is a flow diagram illustrating example operations for wireless communications by a BS, in accordance with certain aspects of the present disclosure.

FIG. 11 is a flow diagram illustrating example operations 1100 for wireless communications, in accordance with certain aspects of the present disclosure. The operations 1100 may be performed, for example, by a base station (e.g., eNB 110). The operations 1100 may begin, at 1102, where the BS receives a narrowband physical random access channel (NPRACH) preamble in a resource block within a set of resource blocks available for narrowband communications with a UE. At 1104, the BS determines another resource block within the set of resource blocks for transmitting a random access response message based at least in part on a location of the resource block in which the NPRACH preamble was received. At 1106, the BS transmits the random access response message in the determined other resource block.

In one aspect, after receiving the NPRACH preamble, the BS may choose to transmit the RAR message in the narrowband anchor PRB. In such a case, the BS may differentiate whether the preamble was transmitted in the anchor PRB or non-anchor PRB based on a random access preamble identifier (RAPID) field and/or random access radio network temporary identifier (RA-RNTI). In one aspect, after receiving the NPRACH preamble, the BS may transmit the RAR message in a PRB that is different from the PRB in which the NPRACH preamble was received. In this aspect, the PRB for the RAR response may be signaled in a SIB together with the PRACH PRB.

In some wireless networks (e.g., LTE Release 13), there may be a NPRACH resource restriction between single tone and multi-tone UEs. Put differently, the resources for PRACH signals may be split into different regions depending on whether the UE supports single-tone transmission and/or multi-tone transmission. Each UE may indicate if the UE supports multi-tone transmission in Msg3 of the NRACH procedure.

Aspects presented herein provide various techniques for determining narrowband PRACH resources for different types of UEs (e.g., Rel-14 UEs, Rel-13 UEs, etc.) that co-exist in the same network.

Figure 12:
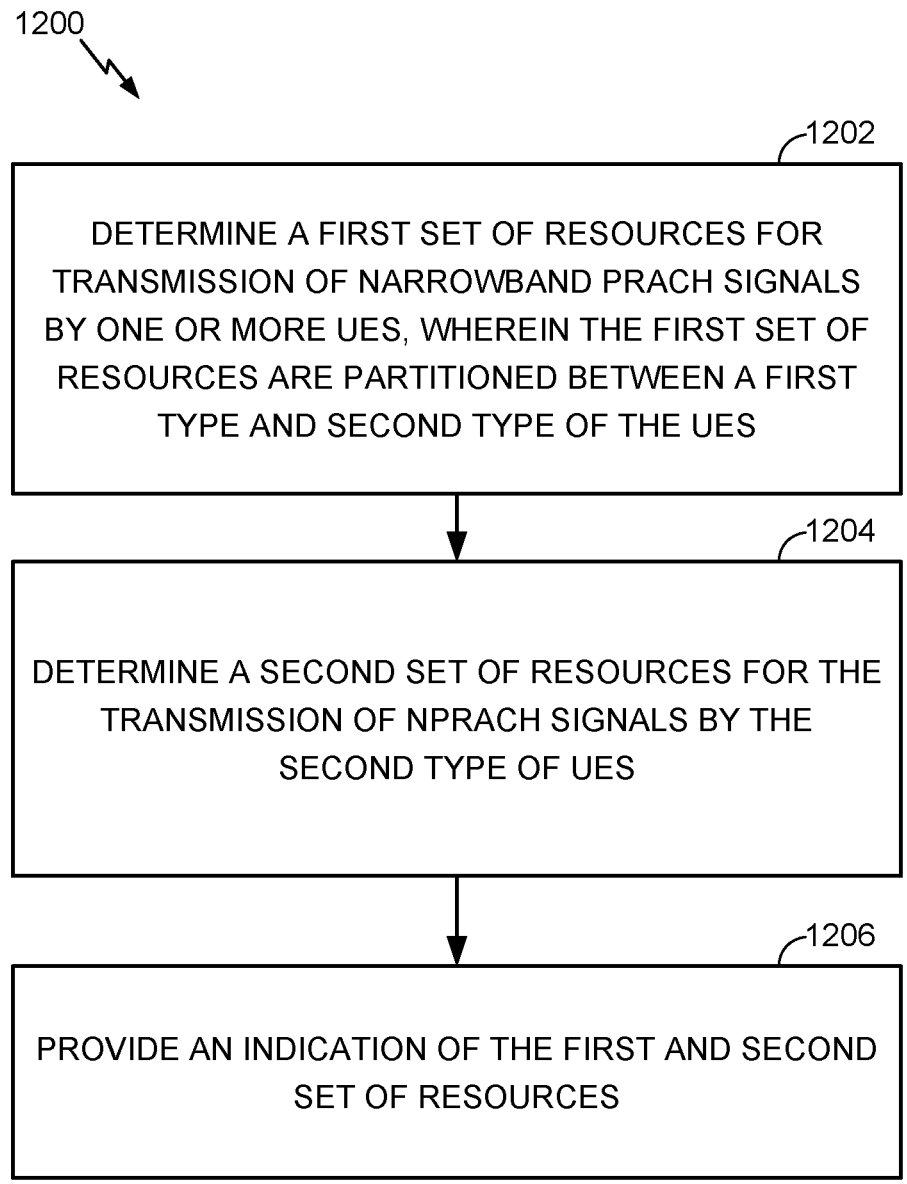
FIG. 12 is a flow diagram illustrating example operations for wireless communications by a BS, in accordance with certain aspects of the present disclosure.

FIG. 12 is a flow diagram illustrating example operations 1200 for wireless communications, in accordance with certain aspects of the present disclosure. The operations 1200 may be performed, for example, by a base station (e.g., eNB 110). The operations 1200 may begin, at 1202, where the BS determines a first set of resources for transmission of narrowband PRACH signals by one or more UEs. The first set of resources are partitioned between a first type and second type of the UEs. At 1204, the BS determines a second set of resources for the transmission of NPRACH signals by the second type of UEs. At 1206, the BS provides an indication of the first and second set of resources.

In one aspect, the first set of resources may include an anchor PRB and one or more non-anchor PRBs, and the second set of resources may include one or more non-anchor PRBs. The BS may allocate the first set of resources to the UEs of the first type and UEs of the second type. The BS may allocate the second set of resources to the UEs of the second type.

Figure 13:
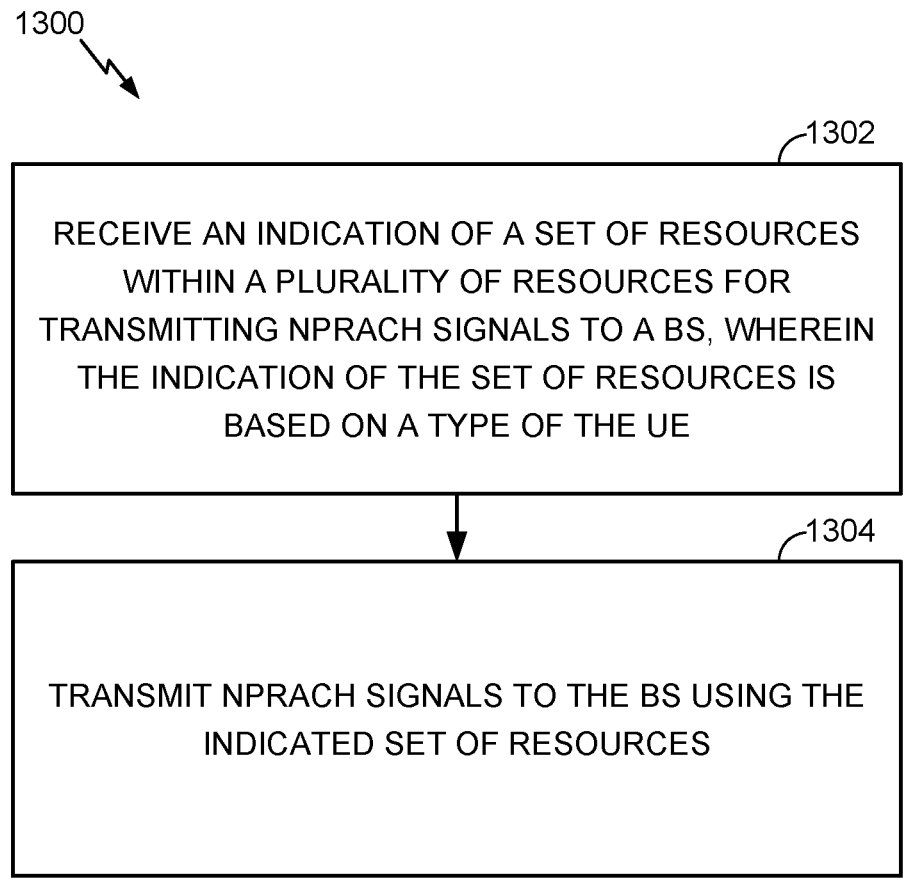
FIG. 13 is a flow diagram illustrating example operations for wireless communications by a UE, in accordance with certain aspects of the present disclosure.

FIG. 13 is a flow diagram illustrating example operations 1300 for wireless communications, in accordance with certain aspects of the present disclosure. The operations 1300 may be performed, for example, by a UE, such as an IoT device. The operations 1300 may begin, at 1302, where the UE receives an indication of a set of resources within a plurality of resources for transmitting NPRACH signals to a BS, wherein the indication of the set of resources is based at least in part on a type of the UE. At 1304, the UE transmits NPRACH signals to the BS using the indicated set of resources.

In one aspect, the first type includes a capability to support single-tone transmission. In one aspect, the second type includes a capability to support multi-tone transmission. In one aspect, each of the Rel-14 UEs may support multi-tone transmission. In this case, there may not be a need to have a resource partition in non-anchor PRB. The Rel-14 UEs may use Msg 3 to indicate their support for multi-tone. In one implementation, the Msg 3 bit (that indicates multi-tone support) may be set to "1." In another implementation, Msg3 may be interpreted differently (e.g., the bit may be reserved or used for another purpose).

In one aspect, one or more of the Rel-14 UEs may not support multi-tone. In such a case, the resources in anchor and non-anchor PRBs may be partitioned. For example, there may be a different percentage of reserved resources in anchor and non-anchor PRB that support multi-tone transmission.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "identifying" encompasses a wide variety of actions. For example, "identifying" may include calculating, computing, processing, deriving, determining, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for selecting, means for allocating, means for identifying, means for transmitting, means for receiving, means for sending, means for monitoring, means for signaling, and/or means for communicating may include one or more processors or other elements, such as the transmit processor 264, the demodulators/modulators 254, the controller/processor 280, the receive processor 258, and/or the antenna(s) 252 of the user equipment 120 illustrated in FIG. 2, and/or the transmit processor 220, the modulators/demodulators 232, the controller/processor 240, the receive processor 238, and/or the antenna(s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    determining a first set of resources and a second set of resources available for narrowband communications with one or more first user equipments (UEs) and one or more second UEs;
    allocating the first and second sets of resources to one or more of the one or more first UEs and of the one or more second UEs based, at least in part, on a type of the one or more first UEs and a type of the one or more second UEs, comprising:
        allocating the first set of resources to the one or more first UEs of a first type;
        allocating the first and second sets of resources to the one or more second UEs of a second type; and
        determining a plurality of parameters for distributing the one or more second UEs of the second type to the first and second sets of resources, wherein the plurality of parameters comprise a first one or more weights associated with the first set of resources and a second one or more weights associated with the second set of resources and wherein the first set of resources comprises an anchor resource block and the second set of resources comprises one or more non-anchor resource blocks; and
    signaling an indication of the allocation and the plurality of parameters.

2. The method of claim 1, wherein:
    the first type comprises a capability to perform narrowband operations in the anchor resource block; and
    the second type comprises a capability to perform narrowband operations in the one or more non-anchor resource blocks.

3. The method of claim 1, wherein the plurality of parameters further comprise one or more probability values for at least one of the first or second sets of resources.

4. The method of claim 1, wherein the first and second sets of resources comprise paging resources, the method further comprising transmitting a narrowband paging message on the paging resources.

5. The method of claim 4, wherein transmitting the narrowband paging message comprises:
    transmitting a control portion of the narrowband paging message using the anchor resource block in the paging resources; and
    transmitting a data portion of the narrowband paging message using one of the one or more non-anchor resource blocks in the paging resources.

6. The method of claim 1, wherein the first and second sets of resources comprise narrowband physical random access channel (NPRACH) resources, the method further comprising monitoring for a NPRACH preamble transmitted on the NPRACH resources.

7. The method of claim 6, further comprising:
    receiving the NPRACH preamble in a resource block within the NPRACH resources;
    determining another resource block within the NPRACH resources for transmitting a random access response (RAR) message based at least in part on a location of the resource block in which the NPRACH preamble was received; and
    transmitting the RAR message in the determined other resource block.

8. A method for wireless communications by a user equipment (UE), comprising:

receiving an indication of a plurality of parameters for determining a set of resources within a plurality of resources available for narrowband communications with a base station (BS);

determining the set of resources to use for the narrowband communications with the BS based at least in part on the plurality of parameters, wherein the plurality of resources comprise paging resources and wherein the plurality of parameters comprise a first weight associated with an anchor resource block in the paging resources and a second weight associated with one or more non-anchor resource blocks in the paging resources; and communicating with the BS using the determined set of resources.

9. The method of claim 8, wherein:
the set of resources is determined further based on a UE identifier; and
communicating with the BS comprises monitoring for a paging channel in the determined set of resources.

10. The method of claim 8, wherein the plurality of resources further comprise narrowband physical random access channel (NPRACH) resources.

11. The method of claim 8, wherein the set of resources is determined further based at least in part on a sum of the first weight and the second weight.

12. The method of claim 10, wherein the NPRACH resources comprise an anchor resource block and one or more non-anchor resource blocks, and wherein the plurality of parameters further comprise one or more probability values associated with the anchor resource block in the NPRACH resources.

13. The method of claim 12, further comprising:
determining a set of NPRACH resources within the NPRACH resources based at least in part on the one or more probability values;
transmitting a NPRACH preamble on the determined set of NPRACH resources.

14. The method of claim 12, wherein one or more probability values associated with the one or more non-anchor resource blocks in the NPRACH resources are determined based at least in part on one minus at least one probability value of the one or more probability values associated with the anchor resource block in the NPRACH resources.

15. The method of claim 12, wherein the indication of the plurality of parameters comprising the first and second weights associated the paging resources and the one or more probability values associated with the NPRACH resources is received in a system information block (SIB).

16. An apparatus for wireless communications, comprising:
means for determining a first set of resources and a second set of resources available for narrowband communications with one or more first user equipments (UEs) and one or more second UEs;
means for allocating the first and second sets of resources to one or more of the one or more first UEs and of the one or more second UEs based, at least in part, on a type of the one or more first UEs and a type of the one or more second UEs, comprising:
means for allocating the first set of resources to the one or more first UEs of a first type;
means for allocating the first and second sets of resources to the one or more second UEs of a second type; and means for determining a plurality of parameters for distributing the one or more second UEs of the second type to the first and second sets of resources, wherein the plurality of parameters comprise a first one or more weights associated with the first set of resources and a second one or more weights associated with the second set of resources and wherein the first set of resources comprises an anchor resource block and the second set of resources comprises one or more non-anchor resource blocks; and means for signaling an indication of the allocation and the plurality of parameters.

17. The apparatus of claim 16, wherein the first type comprises a capability to perform narrowband operations in the anchor resource block, and wherein the second type comprises a capability to perform narrowband operations in the one or more non-anchor resource blocks.

18. The apparatus of claim 16, wherein the plurality of parameters further comprise one or more probability values for at least one of the first or second sets of resources.

19. The apparatus of claim 16, wherein the first and second sets of resources comprise paging resources, the apparatus further comprising means for transmitting a narrowband paging message on the paging resources.

20. The apparatus of claim 16, wherein the first and second sets of resources comprise narrowband physical random access channel (NPRACH) resources, the apparatus further comprising means for monitoring for a NPRACH preamble transmitted on the NPRACH resources.

21. An apparatus for wireless communications, comprising:
means for receiving an indication of a plurality of parameters for determining a set of resources within a plurality of resources available for narrowband communications with a base station (BS);
means for determining the set of resources to use for the narrowband communications with the BS based at least in part on the plurality of parameters, wherein the plurality of resources comprise paging resources and wherein the plurality of parameters comprise a first weight associated with an anchor resource block in the paging resources and a second weight associated with one or more non-anchor resource blocks in the paging resources; and
means for communicating with the BS using the determined set of resources.

22. The apparatus of claim 21, wherein:
the set of resources is determined further based on an identifier for the apparatus; and
the means for communicating comprises monitoring for a paging channel in the determined set of resources.

23. The apparatus of claim 21, wherein the plurality of resources further comprise narrowband physical random access channel (NPRACH) resources.

24. The apparatus of claim 23, wherein the NPRACH resources comprise an anchor resource block and one or more non-anchor resource blocks, and wherein the at least one parameter further comprises one or more probability values associated with the anchor resource block in the NPRACH resources.

25. The apparatus of claim 24, further comprising:
means for determining a set of NPRACH resources within the NPRACH resources based at least in part on the one or more probability values;
means for transmitting a NPRACH preamble on the determined set of NPRACH resources.

26. The method of claim 21, wherein the set of resources is determined further based at least in part on a sum of the first weight and the second weight.

27. The method of claim 24, wherein one or more probability values associated with the one or more non-anchor resource blocks in the NPRACH resources are determined based at least in part on one minus at least one probability value of the one or more probability values associated with the anchor resource block in the NPRACH resources.

28. The method of claim 24, wherein the indication of the plurality of parameters comprising the first and second weights associated the paging resources and the one or more probability values associated with the NPRACH resources is received in a system information block (SIB).

29. An apparatus for wireless communications, comprising:
   at least one processor,
   memory coupled with the at least one processor; and
   instructions stored in the memory and executable by the at least one processor to cause the apparatus to:
      receive an indication of a plurality of parameters for determining a set of resources within a plurality of resources available for narrowband communications with a base station (BS);
      determine the set of resources to use for the narrowband communications with the BS based at least in part on the plurality of parameters, wherein the plurality of resources comprise paging resources and wherein the plurality of parameters comprise a first weight associated with an anchor resource block in the paging resources and a second weight associated with one or more non-anchor resource blocks in the paging resources; and
      communicate with the BS using the determined set of resources.

30. A non-transitory computer-readable medium storing code for wireless communications by a user equipment (UE), the code comprising instructions executable by at least one processor to cause the UE to:
   receive an indication of a plurality of parameters for determining a set of resources within a plurality of resources available for narrowband communications with a base station (BS);
   determine the set of resources to use for the narrowband communications with the BS based at least in part on the plurality of parameters, wherein the plurality of resources comprise paging resources and wherein the plurality of parameters comprise a first weight associated with an anchor resource block in the paging resources and a second weight associated with one or more non-anchor resource blocks in the paging resources; and
   communicate with the BS using the determined set of resources.

* * * * *